(12) United States Patent
Royer

(10) Patent No.: US 7,478,783 B2
(45) Date of Patent: Jan. 20, 2009

(54) FRAME MOUNTED HOSE CLAMP

(75) Inventor: Anthony Scott Royer, Minburn, IA (US)

(73) Assignee: Deere & Company, Moline, IL (US)

( * ) Notice: Subject to any disclaimer, the term of this patent is extended or adjusted under 35 U.S.C. 154(b) by 255 days.

(21) Appl. No.: 11/446,654

(22) Filed: Jun. 5, 2006

(65) Prior Publication Data

US 2008/0048073 A1    Feb. 28, 2008

(51) Int. Cl.
*F16L 3/08* (2006.01)
*F16L 3/12* (2006.01)

(52) U.S. Cl. .......................... 248/74.1; 248/61; 248/65; 248/73; 248/68.1; 248/74.2; 248/49; 248/75; 248/74.3

(58) Field of Classification Search .................... 248/61, 248/65, 73, 68.1, 69, 74.1, 74.2, 49, 75, 74.3
See application file for complete search history.

(56) References Cited

U.S. PATENT DOCUMENTS

| | | | | |
|---|---|---|---|---|
| 1,241,126 A | * | 9/1917 | Kidd | 248/74.4 |
| 1,921,797 A | * | 8/1933 | Armie | 248/69 |
| 2,396,925 A | * | 3/1946 | Morehouse | 248/68.1 |
| 2,413,772 A | * | 1/1947 | Morehouse | 24/457 |
| 3,023,989 A | | 3/1962 | White | 248/68 |
| 3,068,924 A | * | 12/1962 | Summers | 411/113 |
| 3,144,695 A | * | 8/1964 | Budwig | 248/60 |
| 3,146,982 A | * | 9/1964 | Budnick | 248/68.1 |
| 3,182,939 A | * | 5/1965 | Seckerson | 248/73 |
| 3,262,662 A | * | 7/1966 | Gastaldi | 248/68.1 |
| 4,111,268 A | | 9/1978 | Frisbee | 172/805 |
| 4,224,721 A | * | 9/1980 | Ohlson | 24/489 |
| 4,572,302 A | | 2/1986 | Frisbee | 172/813 |
| 5,007,604 A | * | 4/1991 | Richards | 248/62 |
| 5,941,483 A | * | 8/1999 | Baginski | 248/68.1 |
| 5,966,781 A | * | 10/1999 | Geiger | 24/16 PB |
| 6,364,257 B1 | * | 4/2002 | Holder | 248/74.3 |
| 6,394,695 B1 | * | 5/2002 | Chausset | 403/397 |
| 6,435,565 B2 | * | 8/2002 | Potts et al. | 285/124.1 |
| 6,726,166 B2 | * | 4/2004 | Goodman | 248/229.14 |
| 6,764,050 B2 | * | 7/2004 | Takenaga | 248/71 |
| 6,872,027 B2 | * | 3/2005 | Ledingham | 403/400 |

* cited by examiner

*Primary Examiner*—J. Allen Shriver, II
*Assistant Examiner*—Michael McDuffie

(57) ABSTRACT

A hose clamp retainer assembly for an implement includes a retainer welded to the implement and having an apertured wall leading into a cavity. A bolt having a headed end is slidably received within through the apertured wall for support within the cavity. A hose clamp received by the bolt includes a projecting portion abutting the second wall and preventing the headed end from sliding out of the cavity through the apertured wall. The bolt can be easily replaced if damaged.

17 Claims, 2 Drawing Sheets

FRAME MOUNTED HOSE CLAMP

FIELD OF THE INVENTION

The present invention relates generally to line supports for agricultural implements and, more specifically, to clamps for hydraulic or electrical lines.

BACKGROUND OF THE INVENTION

Various clamp structures are provided on implement frames to secure hydraulic hoses or other lines to the frames. One type of structure includes threaded stubs welded directly to a frame component. Such structure can be easily broken or bent as the frame is assembled. Replacement is difficult once the stubs are bent or broken. If threads strip, the clamp is rendered useless.

Typically, the hoses are held in protective alignment with frame components by straps, and if the hoses have differing diameters, the smaller hoses will be loose when the larger hoses are properly secured. Hoses that are not secured properly can move and wear against the clamp structure. If pulled out away from the frame component, the hoses are more vulnerable to damage.

Some two-hose designs allow proper clamping action. However, because of the limited hose capacity of the clamp, numerous clamps have to be stacked or spread out on the frame. Such two-hose designs often utilize a threaded plate with a bolt, and the bolt length is critical. The threads in a threaded plate can easily strip and make the clamp unusable.

Threaded bushings welded to the frame and receiving a clamp-supporting bolt are also available for implements. With such a design, bolt length is critical. When the bushing is welded to the frame the heat deforms the threads, and during manufacture paint gets on threads unless the threaded area is taped or otherwise sealed off. If the area is not taped, a self taping screw is typically required to cut through the paint. For proper painting, the weld has to extend entirely around the circumference of the bushing.

Another hose support design includes a threaded channel secured to the frame. The threads on the channel are easily stripped. Once the threads are stripped, a nut is usually placed on the under side of the plate to receive a bolt, a process which is inconvenient and time consuming. In addition, if the hose clamp loosens, an edge of the channel can cut the hose.

SUMMARY OF THE INVENTION

It is therefore an object of the invention to provide an improved hose support clamp for an implement. It is a further object to provide such a clamp which overcomes most or all of the aforementioned problems.

It is another object to provide an improved hose support clamp for an implement, the clamp reducing or eliminating problems associated with stripped threads. It is yet another object to provide such a clamp that eliminates a threaded piece fixed to the frame. It is still a further object to provide such a clamp having a cavity that allows the head of a support bolt to simply be slid in and out of the clamp portion fixed to the frame.

It is a further object to provide an improved hose support clamp that is lower in cost and more reliable than many other designs and can be used for multiple functions.

It is a further object of the present invention to provide an improved hose support clamp that is able to hold multiple hoses, is low in cost, and is easy to paint and weld. It is also an object to provide such a clamp that is easy to use, is reliable, does not require a critical bolt length, and has a threaded part that is easy to replace if stripped.

A hose support clamp assembly includes a threadless retainer connected to the implement frame or other member on the implement. The retainer includes a hex cavity opening outwardly from a first side of the retainer. The second side of the cavity also opens to allow paint drainage during manufacture. The headed end of a hex bolt is slid through the first side into the cavity. A clamping member such as a P-clamp is placed over the projecting threaded end and includes a downwardly directed portion abutting the side of the retainer opposite the first side to prevent the bolt from sliding out of the cavity. A nut is secured on the threaded end to maintain the support clamp in position.

The support clamp assembly is supports the threaded member for quick and easy replacement without direct connection of the threaded member to the frame. The retainer is easy to weld and paint and reduces paint drip problems. The entire assembly is simple and inexpensive in construction and eliminates need for a precise bolt length. The bolt support function of the clamp prevents lost hardware and hose support failure if the bolt and nut loosen. The retainer also functions as a connector for other hardware mounted on an implement frame.

These and other objects, features and advantages of the present invention will become apparent from the description which follows and from the drawings.

DESCRIPTION OF THE PREFERRED EMBODIMENT

Figure 1:
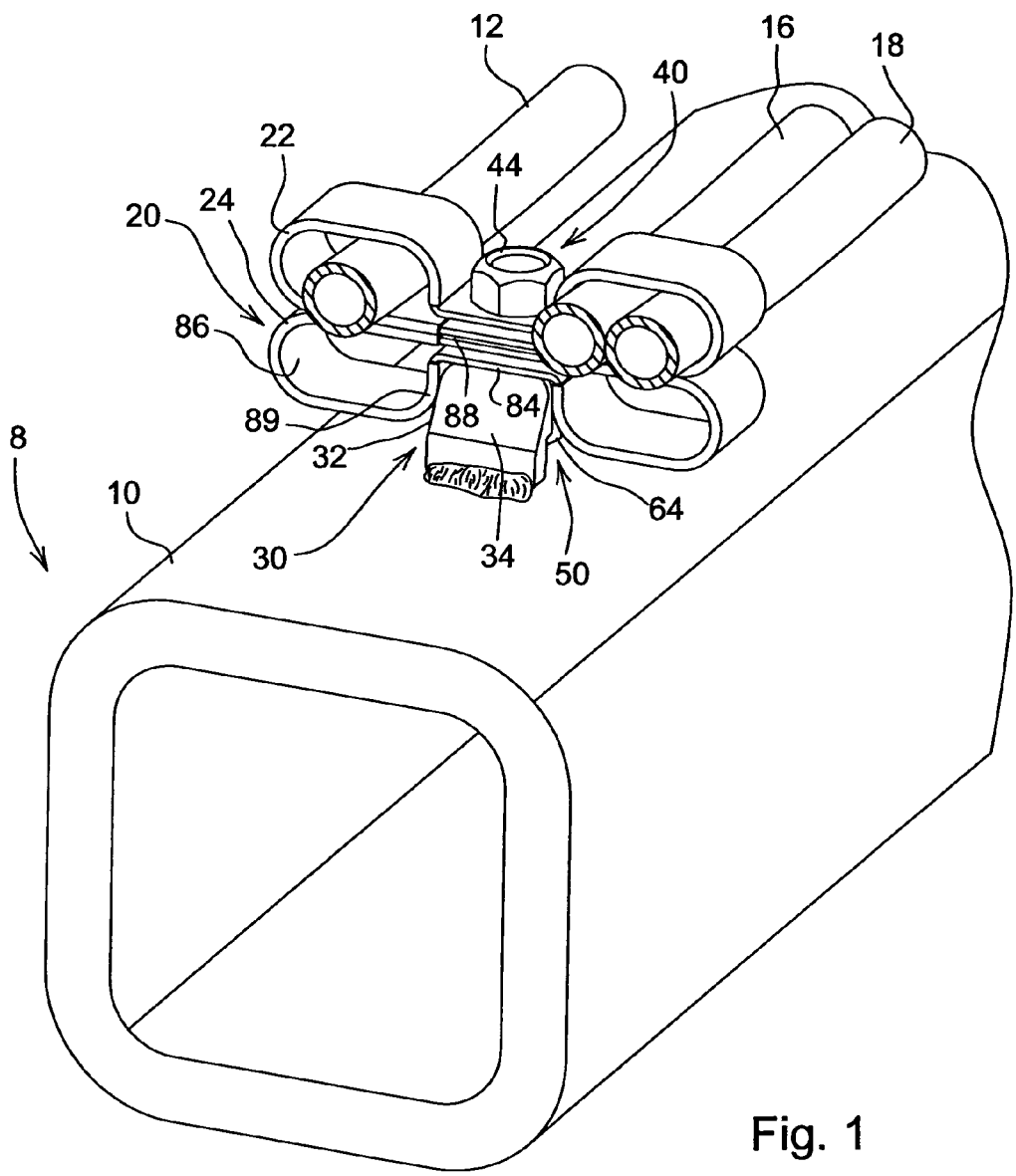
FIG. 1 is a perspective view of a hose support clamp connected to an implement with hydraulic hoses attached thereto.

Referring to FIG. 1, therein is shown a portion of an agricultural implement 8 having a frame 10 supporting lines 12, 16 and 18 or similar conduits, conductors or hoses. The lines 12-18 as shown are hydraulic fluid lines connected between a source of hydraulic fluid (not shown) on a tractor or towing vehicle and a hydraulic motor. To protect the lines 12-18 and maintain the lines away from interference with other portions of the implement and with plant material and the like, hose clamp retainer assemblies, one of which is shown at 20, are mounted on the frame 10 at spaced locations to secure the lines in position on the frame 10. Typically, the retainer assemblies 20 maintain lengths of the lines 12-18 generally parallel to the frame 10.

The hose clamp retainer assembly 20 as shown in FIG. 1 includes first and second P-clamps 22 and 24 supported on a one-piece retainer 30. The retainer 30 is welded to one face of the frame 10 or other support area on the implement 8.

Figure 2:
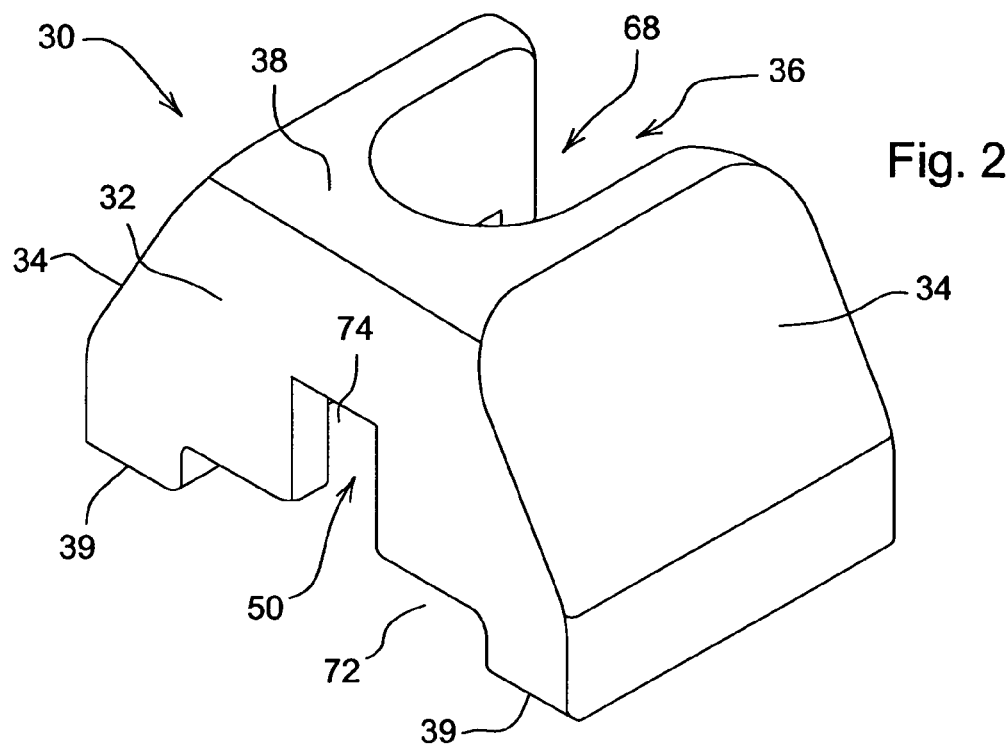
FIG. 2 is an enlarged perspective view of the retainer utilized with the hose support clamp of FIG. 1.
Figure 3:
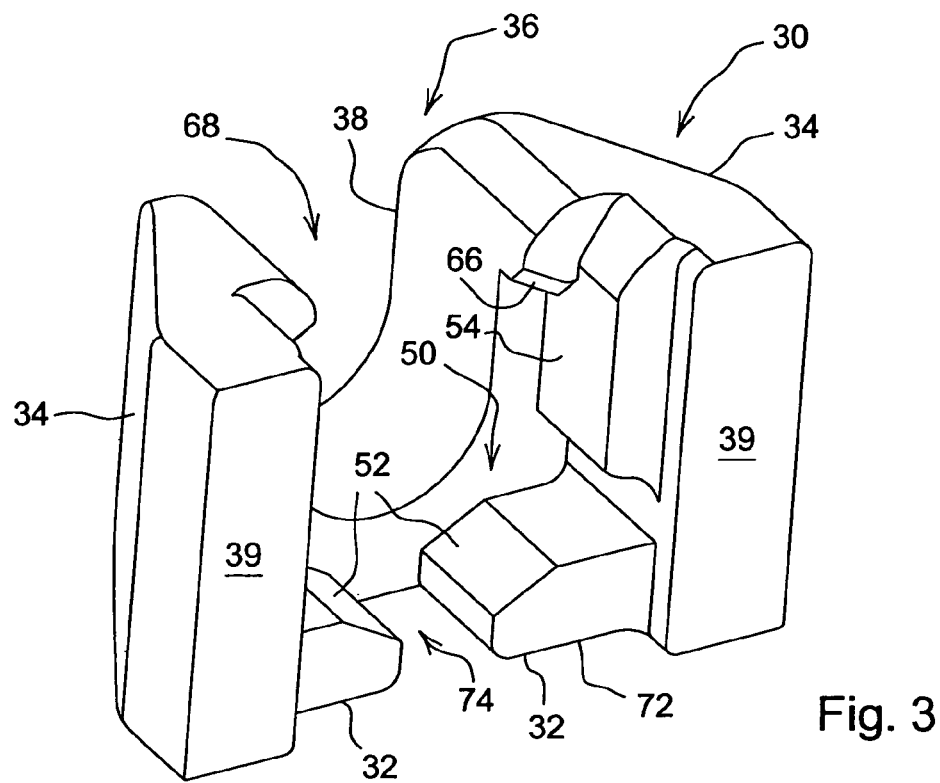
FIG. 3 is a view similar to FIG. 2 but from the opposite side of the retainer.

The retainer 30 as shown in FIGS. 2 and 3 is a unitary piece having an end wall 32 connecting a pair of tapered side walls 34 that extend forwardly from the end wall 32 to an apertured bolt-receiving front portion 36. A slotted top portion 38 joins the tops of the side walls 34, and the side walls 34 terminate in a flat base portion 39. The base portion 39 abuts and is welded to the frame 10. The retainer 30 releasably supports a mounting stud or bolt 40 which receives one or more of the P-clamps 22 and 24. A nut 44 threaded on the bolt 40 secures the P-clamps on the bolt 40.

A cavity 50 is defined between the walls 34 inwardly of the end wall 32 above the plane of the base portion 39. Angled flats 52 (FIG. 3) formed on the inside of the wall 32 and angled flats 54 formed on the insides of the side walls 34 conform generally to the shape of a hexagonal head 64 of the bolt 40 and secure the bolt against rotation. Shortened secondary flats 66 are located at the front portion 36 and help completely capture the head 64 as the nut 44 is tightened and the head 64 is drawn against the bottom of the top portion 38. Other types of studs or bolts 40 may also be employed, including a square neck bolt with a rounded head, and the angled flats 54 and secondary flats 66 are positioned to conform generally to and abut flat surfaces on the bolt or stud.

An outwardly opening U-shaped slot 68 receives the shank portion of the bolt 40 adjacent the head 64 with the threaded end of the bolt 40 projecting upwardly from the retainer 30 to receive one or more of the clamps 22, 24. The bolt 40 slides through the slot 68, and the flats on the hexagonal head 64 abut the angled flats 52 and 54 to prevent rotation of the bolt. As the nut 44 is tightened onto the bolt 40, the head 64 is drawn upwardly against the bottom of the slotted top portion 38. As the head 64 is drawn upwardly, the additional flats 66 abut additional flats on the head 64 to further secure the bolt 40 against rotation and to help prevent movement of the bolt 40 outwardly from the cavity 50.

The end wall 32 includes a lower weep hole area 72 facilitating dripless painting of frame 10 with the retainer 30 attached. A slot 74 continues upwardly from the area 72 between the flats 52 to provide access to the head 64. If the bolt 40 is damaged or has to be changed to provide a different shank length, the operator can access the bolt head 64 to drive the bolt 40 from the cavity 50 if the head becomes wedged or corroded into the cavity.

The clamps 22 and 24 are shown as P-clamps, but it is to be understood that other clamp shapes and types may also be utilized with the present invention. The P-clamp 24 includes a first apertured leg portion 84 received over the threaded end of the bolt 40 and connected a head portion 86 for receiving one or more of the hoses 12-18. The head portion 86 is connected to a second apertured leg portion 88 overlapping the first leg portion 84 and also received over the threaded end of the bolt 40. As the nut 44 is tightened, the leg portions 84 and 86 are sandwiched between the nut 44 and the top of the retainer portion 38 with the head portion gently squeezing the retained hose or hoses to prevent hose movement and scraping. If for any reason the nut 44 should loosen, a projecting portion 89 of the head portion 86 abutting the end wall 32 prevents the headed end 64 from sliding out of the cavity through the apertured front portion 36.

The above-described structure facilitates convenient bolt replacement if the bolt is damaged of if the bolt length needs to be changed for varying the number of support clamps. Different numbers and types of hoses and lines can be easily accommodated. The number and orientation of the hose clamps 20 and 24 can also be varied. For example, the clamps 20 and 24 can be extended at an angle such as 90 degrees to the frame 10 rather than being generally parallel to the frame as shown in FIG. 1.

Having described the preferred embodiment, it will become apparent that various modifications can be made without departing from the scope of the invention as defined in the accompanying claims.

ASSIGNMENT

The entire right, title and interest in and to this application and all subject matter disclosed and/or claimed therein, including any and all divisions,. continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. A hose clamp retainer assembly for an implement, the assembly comprising:
    a retainer connected to the implement and having an apertured wall, a second wall opposite the apertured wall, and a cavity located between the apertured wall and the second wall;
    a bolt member having a headed end slidably received through the apertured wall for support within the cavity, the bolt member having an opposite end projecting from the cavity;
    a hose clamp received by the opposite end;
    wherein the hose clamp includes a projecting portion abutting the second wall and preventing the headed end from sliding out of the cavity through the apertured wall; and
    wherein the hose clamp comprises a P-clamp having a leg received by the bolt member and a head, the head providing an interference fit relative to the retainer.

2. The assembly as set forth in claim 1 wherein the opposite end is threaded, and further including a nut tightened onto the opposite end to secure the hose clamp, wherein the projecting portion maintains the headed end in the cavity if the nut loosens on the opposite end.

3. The assembly as set forth in claim 1 wherein the retainer includes a base portion welded to the implement, and wherein the base portion includes a weep hole opposite the apertured wall for facilitating dripless painting of the retainer and implement adjacent the base portion.

4. A hose clamp retainer assembly for an implement, the assembly comprising:
    a retainer connected to the implement and having an apertured wall, a second wall opposite the apertured wall, and a cavity located between the apertured wall and the second wall;
    a bolt member having a headed end slidably received through the apertured wall for support within the cavity, the bolt member having an opposite end projecting from the cavity;
    a hose clamp received by the opposite end;
    wherein the hose clamp includes a projecting portion abutting the second wall and preventing the headed end from sliding out of the cavity through the apertured wall; and
    wherein the cavity includes flats conforming to the shape of the headed end and preventing rotation of the headed end.

5. The assembly as set forth in claim 4 wherein the flats include a first set of rearward flats contacting the headed end as the headed end is slidably received through the apertured wall, the bolt including a threaded end receiving a nut, and wherein the flats include at least one additional flat further securing the headed end against sliding movement out of the cavity only after the nut is tightened on the bolt.

6. The assembly as set forth in claim 4 wherein the second wall includes a slotted area located between an adjacent pair of the flats.

7. The assembly as set forth in claim 1 wherein the headed end comprises a hexagonal head.

8. A hose clamp retainer assembly for an implement, the assembly comprising:

a retainer connected to the implement and having a bolt-head receiving cavity, an apertured wall located on one side of the cavity, and a second wall located on a side of the cavity opposite the apertured wall;

a bolt having a headed end with flats connected at one end of a threaded shank, the headed end movable through the apertured wall for support within the cavity with the threaded shank projecting from the cavity;

a hose clamp received on the threaded shank; and wherein the hose clamp includes a projection abutting the second wall and preventing the headed end from moving out of the cavity through the apertured wall when the hose clamp is received by the threaded shank.

9. The assembly as set forth in claim 8 further comprising a nut threaded onto the threaded shank and tightening the hose clamp against the retainer, wherein the projection abuts the second wall as the nut is unthreaded from the shank to maintain the headed end within the cavity even when the nut is loosened.

10. The assembly as set forth in claim 9 including secondary flats recessed within the cavity and confining the headed end firmly within the cavity when the nut is tightened, the headed end moving from the secondary flats as the nut is loosened to permit removal of the headed end from the cavity through the apertured wall when the hose clamp is removed from the threaded shank.

11. The assembly as set forth in claim 8 wherein the second wall of the retainer is apertured to facilitate dripless painting and provide access to the headed end.

12. The assembly as set forth in claim 8 wherein the hose clamp comprises a P-clamp having an apertured leg portion connected to a conduit-receiving head, and wherein the projection comprises a portion of the conduit-receiving head.

13. The assembly as set forth in claim 12 wherein the leg portion is received over the threaded shank and the conduit-receiving head limits movement of the headed end away from the second wall.

14. A hose clamp retainer assembly for an implement, the assembly comprising:

a retainer connected to the implement and having a bolt-head receiving cavity, an apertured wall located on one side of the cavity, and a second wall located on a side of the cavity opposite the apertured wall;

a bolt having a headed end with flats connected at one end of a threaded shank, the headed end movable through the apertured wall for support within the cavity with the threaded shank projecting from the cavity;

a hose clamp received on the threaded shank; and wherein the hose clamp includes a hose-receiving portion, the hose-receiving portion providing an interference fit relative to the second wall and preventing the headed end from moving out of the cavity through the apertured wall when the hose clamp is received by the threaded shank.

15. The assembly as set forth in claim 14 further comprising a nut threaded onto the threaded shank and tightening the hose clamp against the retainer, wherein the hose-receiving portion abuts the second wall as the nut is unthreaded from the shank to maintain the headed end within the cavity even when the nut is loosened.

16. The assembly as set forth in claim 15 including flats located within the cavity and confining the headed end against rotation within the cavity.

17. The assembly as set forth in claim 16 including secondary recessed flats within the cavity, wherein the headed end abuts the secondary flats when the nut is tightened, the headed end moving away from the secondary flats as the nut is loosened to permit removal of the headed end from the cavity through the apertured wall when the hose clamp is removed from the threaded shank.

* * * * *